United States Patent [19]

Sakamoto et al.

[11] Patent Number: 5,266,990
[45] Date of Patent: Nov. 30, 1993

[54] ELECTRONIC FLASH DEVICE

[75] Inventors: Hiroshi Sakamoto, Kawasaki; Ryotaro Takayanagi, Yokosuka; Hideki Matsui; Nobuyoshi Hagiuda, both of Yokohama, all of Japan

[73] Assignee: Nikon Corporation, Tokyo, Japan

[21] Appl. No.: 913,942

[22] Filed: Jul. 17, 1992

[30] Foreign Application Priority Data

Jul. 24, 1991 [JP] Japan ................ 3-65703[U]

[51] Int. Cl.⁵ .................................... G03B 15/03
[52] U.S. Cl. .......................... 354/149.1; 354/126; 354/127.1
[58] Field of Search ............ 354/149.1, 126, 127.1

[56] References Cited

U.S. PATENT DOCUMENTS

| 4,078,240 | 3/1978 | Kaneko et al. | 354/126 |
| 4,512,644 | 4/1985 | Yoshida | 354/149.1 |
| 4,866,465 | 9/1989 | Gallegos | 354/126 |
| 4,916,475 | 4/1990 | Hori | 354/149.1 |
| 5,019,845 | 5/1991 | Asakura | 354/149.1 |

Primary Examiner—Monroe H. Hayes
Attorney, Agent, or Firm—Shapiro and Shapiro

[57] ABSTRACT

An electronic flash device which is pivotally movable about an axis intersecting the focal plane of a photo-taking lens and of which the light distribution is changed relative to the angle of view of a camera by pivotally moving comprises a light distribution setting device for setting the amount of light distribution, a posture detecting device for detecting the posture of the electronic flash device relative to the camera, a determining device for determining the amount of light distribution on the basis of a desired amount of light distribution set by the light distribution setting device and the posture detected by the posture detecting device, and a light distribution changing device for controlling the light distribution on the basis of the amount of light distribution determined by the determining device.

10 Claims, 3 Drawing Sheets

ELECTRONIC FLASH DEVICE

BACKGROUND OF THE INVENTION

1. Field of the Invention

This invention relates to an electronic flash device having light distribution control means.

2. Related Background Art

As shown in FIG. 5 of the accompanying drawings, there has been an electronic flash device 106 capable of selecting the postures of horizontal position a, c and a vertical position b by the rotating mechanism of a leg 112 when the flash device is mounted on a camera 100. The reason why such a mechanism is adopted is that it is desired to move the position of the light emitting portion 106a of the electronic flash device 106 relative to the optical axis of a photo-taking lens 107 for the purpose of controlling the shadow of the background of an object in photographing using the electronic flash device. A system in which a rotating mechanism is provided on the leg 112 and the entire electronic flash device 106 is rotated is simple in structure and therefore has merits of compactness and great durability.

Now, as regards the light distribution of an electronic flash device, in a 35 mm single-lens reflex camera as shown in FIG. 5, it is preferable that in accordance with the angle of view of the camera, light distribution be wide in the horizontal direction and light distribution be stopped down in the vertical direction. By doing so, the object field can be illuminated more efficiently than by light distribution called non-directional or circular light distribution and the guide number is increased and the photographable distance also is increased. In FIG. 5, the electronic flash device 106 has a light distribution stopped down in the horizontal direction in the horizontal position a.

When in actually using such an electronic flash device 106, the electronic flash device 106 is brought into the horizontal position b, the angle of view of the photo-taking lens 107 cannot sometimes be covered because the light distribution in the horizontal direction is narrow. For example, let it be assumed that a photo-taking lens of focal length 35 mm is used in the camera 100 and the electronic flash device 106 has a light distribution covering the photo-taking lens of focal length 35 mm at the horizontal position a, c. At this time, specifically, the light distribution in the vertical direction is 45° and the light distribution in the horizontal direction is 60°. When the electronic flash device 106 is brought into the vertical position b, the vertical direction and the horizontal direction change places with each other and therefore, the angle of view in the vertical direction can be covered, but the angle of view in the horizontal direction cannot be covered. So, there has heretofore been an inconvenience that the electronic flash device 106 is used with a wide panel mounted thereon only when the flash device is brought into the vertical position, or with the wide panel always mounted on the electronic flash device to avoid cumbersomeness and with the guide number reduced.

Also, this problem is attributable to the fact that the light emitting portion 106a rotates about the rotating mechanism of the leg 112, and to prevent the light emitting portion 106a from rotating relative to the angle of view of the camera 100, the downsizing of the electronic flash device is precluded only in the portion of that rotating mechanism. Also, if the light distribution characteristic is made non-directional, the influence of rotation will be eliminated, but the guide number will be reduced as previously described.

SUMMARY OF THE INVENTION

It is the object of the present invention to provide an electronic flash device which is based on a system in which the light emitting portion of the electronic flash device rotates about the rotating mechanism of a leg, and yet is designed such that an appropriate light distribution is automatically selected when the electronic flash device changes its posture.

DESCRIPTION OF THE PREFERRED EMBODIMENTS

Some embodiments of the present invention will hereinafter be described in detail with reference to the drawings.

Figure 1:
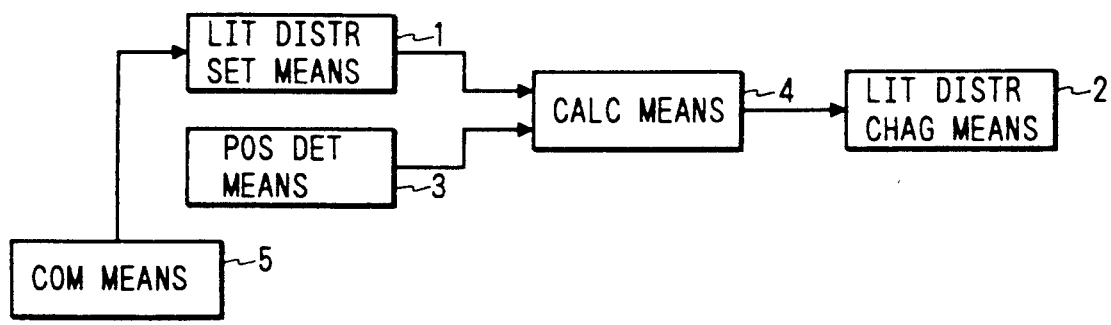
FIG. 1 is a block diagram showing the basic construction of an electronic flash device according to the present invention.

In an embodiment of an electronic flash device which is pivotably movable about the direction of the optical axis of a camera and of which the light distribution is changed relative to the angle of view of the camera by the pivotal movement, as shown in the block diagram of FIG. 1, provision is made of light distribution setting means 1, light distribution changing means 2, posture detecting means 3 for the electronic flash device, and calculation means 4, and the result of the setting by the light distribution setting means 1 and the result of the detection by the posture detecting means 3 are processed by the calculation means 4, and on the basis of the result of the calculation by the calculation means, the light distribution changing means 2 controls the light distribution.

Also, the light distribution setting means 2 may effect setting from a setting member provided in the electronic flash device or may effect setting from a setting member provided in the camera and transmit it through communication means 5.

In this embodiment, the pivotal movement of the electronic flash device is detected by the posture detecting means, and the light distribution covering the angle of view of the camera is optimally set in conformity with the posture of the electronic flash device, whereby the eclipse of the light distribution is prevented.

Embodiment 1

Figure 2A:
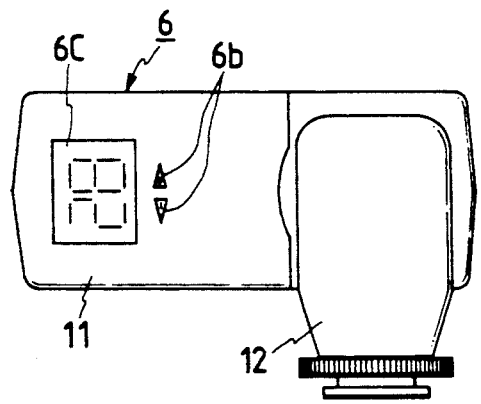
FIG. 2A is a rear view showing the construction of the electronic flash device according to the present invention.
Figure 2B:
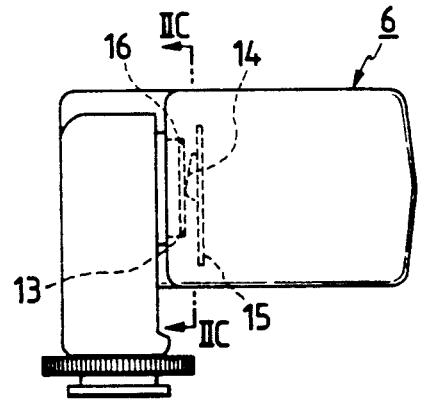
FIG. 2B is a side view thereof.
Figure 2C:
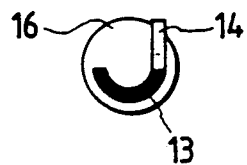
FIG. 2C is a cross sectional view taken along the line IIC—IIC of FIG. 2B.
Figure 5:
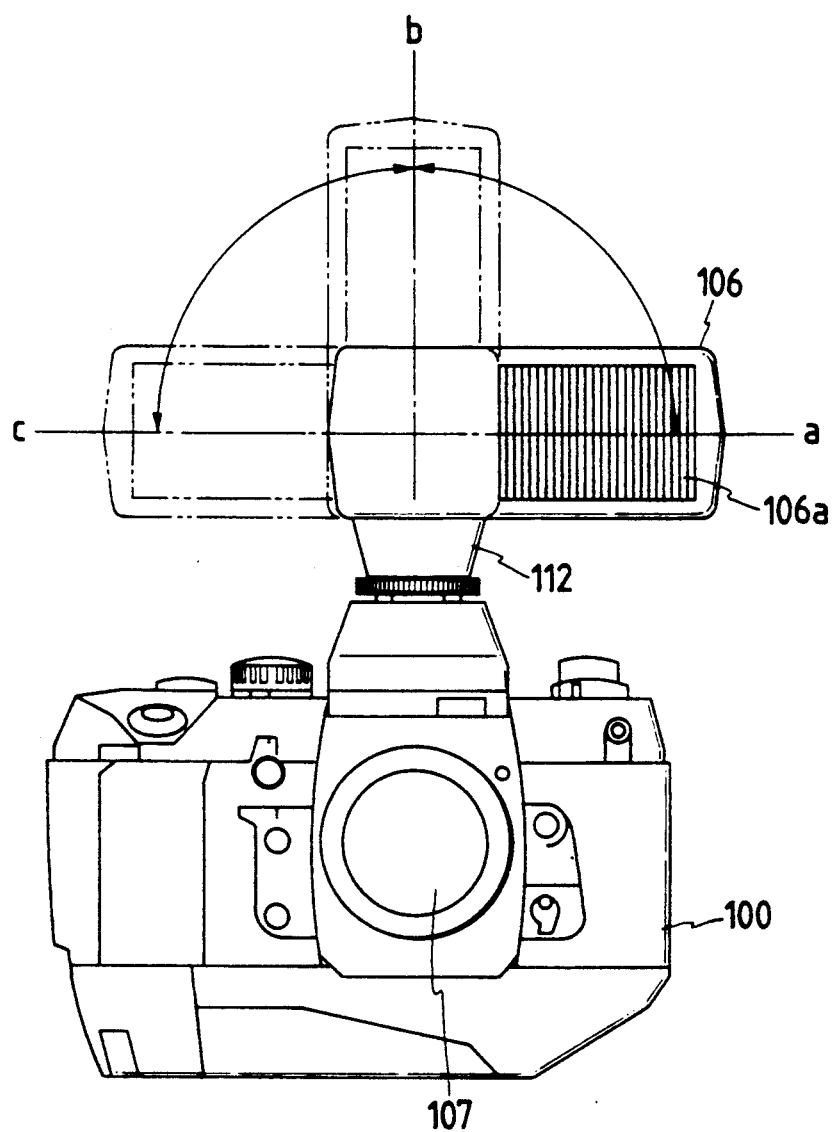
FIG. 5 is a front view illustrating an electronic flash device to which the present invention is directed.

Embodiment 1 supposes an electronic flash device 6 having click stops in the horizontal position a, c and the vertical position b as shown in FIG. 5 and having a pivotally moving function. The electronic flash device 6 has the structure shown in the rear view of FIG. 2A and the side view of FIG. 2B, and the electronic flash device body 11 is pivotable relative to a leg 12. As shown in FIG. 2C, there is an electrode pattern 13 on a base plate 16 fixed to the interior of the leg 12, and a brush 14 fixed to a base plate 15 fixed to the interior of the electronic flash device body 11 is capable of contacting with the electrode pattern 13. The electrode pattern 13 is of an arcuate shape of less than 180° as shown in FIG. 2C, and is adapted not to contact with the brush 14 in the horizontal position a, c. Also, it is to be understood that the electrode pattern 13 is electrically of GND level and the brush 14 is connected to the input terminal of a microcomputer, not shown, in the electronic flash device body 11. Accordingly, in the state of FIG. 2C, the brush 14 is electrically opened, and by a signal "H" being input to the microcomputer, the microcomputer can detect that the electronic flash device 6 is in the horizontal position a, c relative to the angle of view of the camera 100. An LCD 6C which is display means and a pair of buttons 6b which are light distribution setting means are provided on the back of the electronic flash device. By depressing one of the buttons 6b, a light distribution value can be selected from a group of predetermined light distribution values, and the selected light distribution value is displayed on the LCD 6C.

Figure 3:
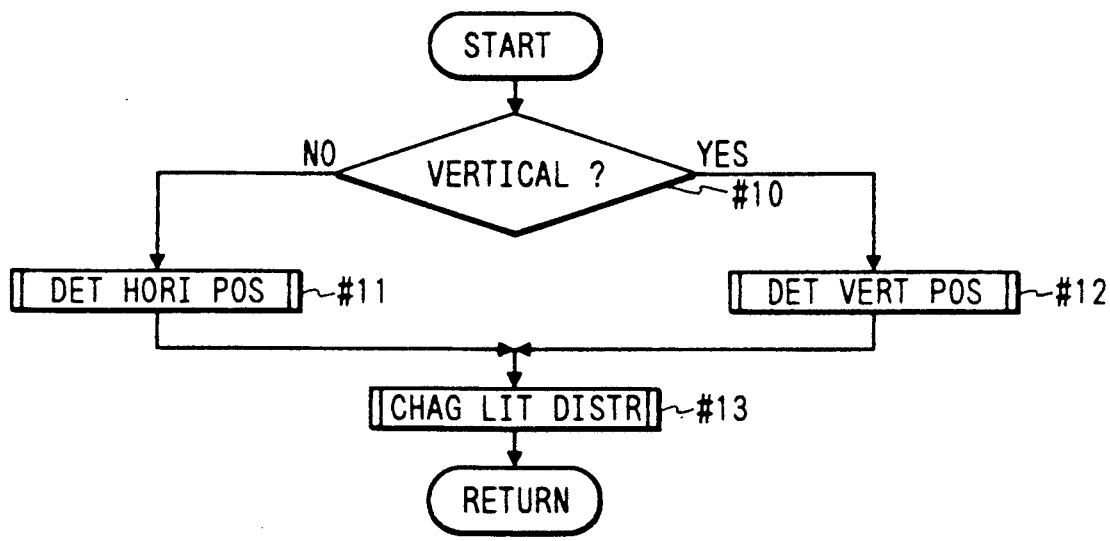
FIG. 3 is a flow chart illustrating the operation of the electronic flash device according to the present invention.

The procedure until the light distribution changing means 2 of FIG. 1 is operated from the result of the detection by the posture detecting means 3 by calculation will now be described with reference to the flow chart of the aforedescribed microcomputer. FIG. 3 shows the subroutine of this calculation. At a step 10 (hereinafter referred to as #10), whether the electronic flash device 6 is in the horizontal position a, c or in the vertical position b is judged from the state of the terminal of the microcomputer connected to the brush 14. Strictly, from the aforedescribed structure, any posture slightly off the horizontal position a, c is judged as the vertical position, but a wide light distribution is required except in the horizontal position a, c and therefore, it will do if the horizontal position a, c or the other position can be discriminated.

If the electronic flash device is in the horizontal position a, c, advance is made to #11, where as shown in Table 1 below, a light distribution is selected in accordance with the light distribution setting. That is, the content of Table 1 is the normal light distribution of this electronic flash device 6 when the horizontal position is regarded as the standard. Thereafter, at #13, the well-known light distribution changing means 2 is driven to thereby obtain a desired light distribution.

TABLE 1

| Light Distribution | Light Distribution | |
|---|---|---|
| Setting | Vertical | Horizontal |
| 24 mm | 70° × | 78° |
| 28 mm | 60° × | 70° |
| 35 mm | 46° × | 60° |
| 50 mm | 36° × | 46° |
| 70 mm | 26° × | 36° |

Now, if at #60, it is judged that the electronic flash device is in the vertical position b, shift is made to #12, where a result conforming to Table 2 below is obtained. When by suitably depressing the button 6b, the set value of a light distribution is selected from Table 2 below, for example, in the case of a 35 mm lens cover, the light distribution setting selects the set value of a 28 mm lens cover when the electronic flash device is in the horizontal position, and at #13, a light distribution 70°×60° is obtained. This is a light distribution too wide in the vertical direction to a 35 mm lens, but in the horizontal direction, it is the same as the light distribution when the electronic flash device 6 is in the horizontal position, and no eclipse occurs. Thus, the initial purpose is achieved.

TABLE 2

| Light Distribution Setting | Selection of Light Distribution | Light Distribution | | Display |
|---|---|---|---|---|
| | | Vertical | Horizontal | |
| 24 mm | 24 mm | 78° × | 70° | 28 mm |
| 28 mm | 24 mm | 78° × | 70° | 28 mm |
| 35 mm | 28 mm | 70° × | 60° | 35 mm |
| 50 mm | 35 mm | 60° × | 46° | 50 mm |
| 70 mm | 50 mm | 46° × | 36° | 70 mm |

Also, when in response to this, the light distribution of the electronic flash device 6 is to be displayed in terms of focal length, the value of the light distribution setting is displayed. Accordingly, even if in the previous example, the electronic flash device is in the vertical position and the set value of a 28 mm lens cover is selected, display is 35 mm.

Further, when the widest light distribution in the horizontal position is selected as an example which cannot absolutely coped with in principle, the light distribution covering it in the vertical position b does not exist and therefore, display is the display of the photographable wide angle end. Specifically, when in Table 2 above, a light distribution of 24 mm is set, the light distribution covering it in the vertical position b cannot be selected and therefore, the 24 mm light distribution at the wide angle end of the horizontal position a, c is selected and the display on the LCD 6C is 28 mm. This display calls the photographer's attention.

The aforedescribed light distribution setting means 1 may be one which is set by a setting member provided in the camera 100 through the communication means 5, or one by which the photographer sets a desired value by the use of the setting member of the electronic flash device 6. Particularly in the case of the latter, the connection with display is necessary and therefore, consideration for any unexecutable position not to be displayed as previously described when the electronic flash device is in the vertical position b becomes necessary.

Embodiment 2

In Embodiment 2, description will be made of the calculation means 4 of an electronic flash device the pivotal movement of which can be fixed at any angle. First, as a premise, it is to be understood that the light distribution is changeable in a shape substantially analogous to the angle of view of the camera 100 by the light distribution changing means 2 and the amount by which the center of the light emitting portion 6a of the electronic flash device 6 is moved relative to the optical axis of the camera by the pivotal movement of the electronic flash device is negligibly small relative to the focal length. Accordingly, on the surface of the object, it can be deemed that the light distribution pivotally moves on the optical axis with the pivotal movement of the electronic flash device 6.

Figure 4:
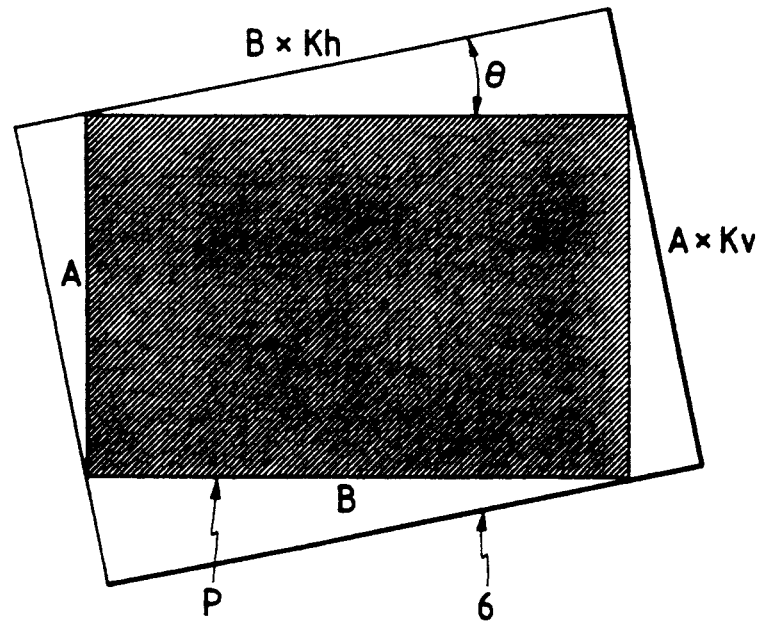
FIG. 4 illustrates the principle of calculation of Embodiment 2 of the electronic flash device according to the present invention.

In FIG. 4, it is to be understood that a batched portion shown by shorter sides A and longer sides B is a light distribution pattern P in the horizontal position a, c of the electronic flash device 6. The pivotal movement of the electronic flash device 6 by an angle $\theta$ can be known by the encoder or the like of the posture detecting means 3 and the light distribution required is a rectangle having the shorter side $A \times Kv$ and the longer side $B \times Kh$ including the hatched portion. Kv and Kh can be geometrically found from:

$$Kv = (A \times ABS(\cos\theta) + B \times ABS(\sin\theta))/A$$

$$Kh = (A \times ABS(\sin\theta) + B \times ABS(\cos\theta))/B$$

ABS is a function which gives an absolute value. If greater one of Kv and Kh is substituted for a magnification K and the light distribution is enlarged to K times on the surface of the object, the angle of view can be covered without eclipse. Now, the fact that the light distribution is enlarged to K times on the surface of the object is equal to the fact that with the surface of the object being assumed to be sufficiently far, the angle of view of a lens having a focal length of 1/K time is covered. Accordingly, it will be seen that on the basis of the magnification K obtained as the result of the aforedescribed calculation, the light distribution can be controlled to a light distribution which can cover a lens having a focal length of 1/K time at the position before pivotal movement (the reference position).

As described above, according to the present invention, there is obtained a very excellent effect that a light distribution free of eclipse is automatically selected with a change in the posture of the electronic flash device which has heretofore been done and failure in photographing can be prevented. There is also obtained a very excellent effect that even in the case of an electronic flash device the posture of which can be fixed at any angle so as to effect delicate control of shadow, not too wide an optimal light distribution is obtained and a problem such as a reduction in the guide number can be minimized.

What is claimed is:

1. An electronic flash device which is pivotally movable about an axis intersecting the focal plane of a photo-taking lens and of which the light distribution is changed relative to the angle of view of a camera by pivotally moving, comprising:
    light distribution setting means for setting the amount of light distribution;
    posture detecting means for detecting the posture of said electronic flash device relative to said camera;
    determining means for determining the amount of light distribution on the basis of a desired amount of light distribution set by said light distribution setting means and the posture detected by said posture detecting means; and
    light distribution changing means for controlling the light distribution on the basis of the amount of light distribution determined by said determining means.

2. An electronic flash device according to claim 1, wherein said light distribution setting means is a setting member mounted on said electronic flash device and capable of manually setting a desired amount of light distribution.

3. An electronic flash device according to claim 1, wherein said posture detecting means detects a pivotally moved position relative to the axis.

4. An electronic flash device according to claim 1, further comprising display means for displaying the desired amount of light distribution set by said light distribution setting means.

5. An electronic flash device according to claim 4, wherein when the amount of light distribution determined by said determining means is greater than the set desired amount of light distribution, said display means displays said determined amount of light distribution.

6. An electronic flash device which is pivotally movable about an axis intersecting the focal plane of a photo-taking lens and of which the light distribution is changed relative to the angle of view of a camera by pivotally moving and which is mountable on a camera having light distribution setting means for setting the amount of light distribution, comprising:
    posture detecting means for detecting the posture of said electronic flash device relative to said camera;
    determining means for determining the amount of light distribution on the basis of a desired amount of light distribution set by said light distribution setting means and the posture detected by said posture detecting means; and
    light distribution changing means for controlling the light distribution on the basis of the amount of light distribution determined by said determining means.

7. An electronic flash device according to claim 6, wherein said light distribution setting means is a setting member mounted on said electronic flash device and capable of manually setting a desired amount of light distribution.

8. An electronic flash device according to claim 6, wherein said posture detecting means detects a pivotally moved position relative to the axis.

9. An electronic flash device according to claim 6, further comprising display means for displaying the desired amount of light distribution set by said light distribution setting means.

10. An electronic flash device according to claim 9, wherein when the amount of light distribution determined by said determining means is greater than the set desired amount of light distribution, said display means displays said determined amount of light distribution.

* * * * *